United States Patent
Teipel et al.

(10) Patent No.: US 10,246,583 B2
(45) Date of Patent: Apr. 2, 2019

(54) CELLULOSE NANOCRYSTAL POLYMER COMPOSITE

(71) Applicants: Blake Teipel, College Station, TX (US); Elisa Teipel, College Station, TX (US); Matt Kirby, Bryan, TX (US); Ryan Vano, College Station, TX (US)

(72) Inventors: Blake Teipel, College Station, TX (US); Elisa Teipel, College Station, TX (US); Matt Kirby, Bryan, TX (US); Ryan Vano, College Station, TX (US)

( * ) Notice: Subject to any disclaimer, the term of this patent is extended or adjusted under 35 U.S.C. 154(b) by 22 days.

(21) Appl. No.: 15/315,550

(22) PCT Filed: Jun. 3, 2015

(86) PCT No.: PCT/US2015/034004
§ 371 (c)(1),
(2) Date: Dec. 1, 2016

(87) PCT Pub. No.: WO2015/195340
PCT Pub. Date: Dec. 23, 2015

(65) Prior Publication Data
US 2017/0107371 A1    Apr. 20, 2017

Related U.S. Application Data

(60) Provisional application No. 62/007,224, filed on Jun. 3, 2014.

(51) Int. Cl.
*C08L 63/00* (2006.01)
*C08L 1/04* (2006.01)
(Continued)

(52) U.S. Cl.
CPC ............ *C08L 63/00* (2013.01); *C08J 3/12* (2013.01); *C08J 3/20* (2013.01); *C08K 3/346* (2013.01);
(Continued)

(58) Field of Classification Search
CPC ........................................ C08L 63/00
See application file for complete search history.

(56) References Cited

U.S. PATENT DOCUMENTS

| 6,967,027 B1 | 11/2005 | Heux et al. |
| 8,182,918 B2 | 5/2012 | Netravali et al. |

(Continued)

FOREIGN PATENT DOCUMENTS

| GB | 1501239 A | 2/1978 |
| PH | 12011000013 | 1/2011 |
| WO | 2006121385 A1 | 11/2006 |

OTHER PUBLICATIONS

Majeed K, Jawaid M, Hassan A, Bakar AA, Khalil HA, Salema AA, Inuwa I. Potential materials for food packaging from nanoclay/natural fibres filled hybrid composites. Materials & Design. Apr. 1, 2013;46:391-410.*

(Continued)

*Primary Examiner* — Megan McCulley
(74) *Attorney, Agent, or Firm* — Vivacqua Law, PLLC

(57) ABSTRACT

A reinforced polymer composite includes a polymer matrix and a strengthening agent. The strengthening agent includes highly crystalline cellulose nanocrystals (CNC) and a stabilizing agent. The crystalline cellulose nanocrystals (CNC) have dimensions of about 3 to 5 nm in width and about 100 to 300 nm in length and a density of about 1.6 g/cm³ and the stabilizing agent may be one of Boehmite nanoclay (Boe) and Cetyltrimethylammonium Bromide (CTAB) or a combination of both.

18 Claims, 4 Drawing Sheets

(51) Int. Cl.

| | | |
|---|---|---|
| *C08J 3/12* | (2006.01) | |
| *C08J 3/20* | (2006.01) | |
| *C08K 3/34* | (2006.01) | |
| *C08K 5/19* | (2006.01) | |
| *B29K 201/00* | (2006.01) | |
| *B29K 105/16* | (2006.01) | |
| *B29C 39/00* | (2006.01) | |
| *B29K 63/00* | (2006.01) | |

(52) U.S. Cl.
CPC ............... *C08K 5/19* (2013.01); *C08L 1/04* (2013.01); *B29C 39/003* (2013.01); *B29K 2063/00* (2013.01); *B29K 2105/162* (2013.01); *B29K 2201/00* (2013.01); *C08J 2301/00* (2013.01)

(56) References Cited

U.S. PATENT DOCUMENTS

| | | | |
|---|---|---|---|
| 8,293,003 B1 | 10/2012 | Thomson et al. | |
| 8,349,948 B2 | 1/2013 | Hamad et al. | |
| 8,679,292 B2 | 3/2014 | Hamad et al. | |
| 9,751,969 B2* | 9/2017 | Hamad | C08F 251/02 |
| 9,815,910 B2* | 11/2017 | Hu | C08B 15/00 |
| 9,926,668 B2* | 3/2018 | Axrup | D21H 17/64 |
| 2009/0069550 A1* | 3/2009 | Belanger | C07G 1/00 530/507 |
| 2010/0162926 A1* | 7/2010 | Thomson | C04B 28/02 106/805 |
| 2011/0059441 A1 | 3/2011 | Pelton et al. | |
| 2011/0111998 A1* | 5/2011 | Barraza | A61K 8/03 510/119 |
| 2011/0151255 A1 | 6/2011 | Kim et al. | |
| 2011/0290149 A1* | 12/2011 | Beck | C08B 15/08 106/163.01 |
| 2012/0283363 A1 | 11/2012 | Kumamoto et al. | |
| 2013/0122533 A1* | 5/2013 | Pitchai-Mydeen | C08J 5/18 435/28 |
| 2013/0131332 A1 | 5/2013 | Shoseyov et al. | |
| 2013/0171439 A1 | 7/2013 | Shoseyov et al. | |
| 2013/0264732 A1* | 10/2013 | Youngblood | B29C 41/24 264/28 |
| 2014/0335132 A1* | 11/2014 | Burt | A61K 9/2054 424/400 |
| 2014/0350188 A1 | 11/2014 | Hamad et al. | |
| 2015/0045454 A1* | 2/2015 | Kong | D01F 1/10 514/778 |
| 2015/0075406 A1* | 3/2015 | Nemoto | B01D 39/18 106/164.01 |
| 2015/0322191 A1 | 11/2015 | Hamad et al. | |
| 2016/0075601 A1* | 3/2016 | Youngblood | A61K 6/0008 106/805 |
| 2016/0122441 A1* | 5/2016 | Miyoshi | A61Q 5/02 132/202 |
| 2016/0340827 A1 | 11/2016 | Yamato et al. | |
| 2016/0369078 A1* | 12/2016 | Lapidot | C08B 15/08 |
| 2017/0027168 A1* | 2/2017 | Heath | A01N 25/30 |

OTHER PUBLICATIONS

Miao C, Hamad WY. Cellulose reinforced polymer composites and nanocomposites: a critical review. Cellulose. Oct. 1, 2013;20(5):2221-62.*

Z. V. P. Murthyi, In situ synthesis of nanoclay filled polyethylene using polymer supported metallocene catalyst system.

Majeed, K; Potential materials for rood packaging from nanoclay/natural fibres filled hybrid composites.

Chuanwei Miao, Cellulose reinforced polymer composites arid nanocomposites: a critical review; Cellulose (2013) 20:2221-2262. Vancouver BC Canada.

Raghavendra Ratnakar Hegde, Structure and Properties of Nanoclay Reinforced Polymer Films, Fibers and Nonwovens; University of Tennessee, Knoxville, Doctoral Dissertations, Aug. 2009.

T.Abitol et al., Surface modification of cellulose nanocrystals with cetyltrimethylammonium bromide, vol. 29, No. 1 2014.

* cited by examiner

CELLULOSE NANOCRYSTAL POLYMER COMPOSITE

CROSS REFERENCE TO RELATED APPLICATION

This application claims the benefit of International Application No. PCT/US15/34004 filed Jun. 3, 2015, which claims benefit to U.S. Provisional Patent Application Ser. No. 62/007,224, filed Jun. 3, 2014, each of which are hereby incorporated in their entirety herein by reference.

FIELD

The invention relates generally to polymer composites and more specifically to cellulose nanocrystal reinforced polymer composite materials.

BACKGROUND

The statements in this section merely provide background information related to the present disclosure and may or may not constitute prior art.

Cellulosic nanomaterials (CN), are the smallest member of the overall hierarchy of cellulose materials and are the most abundant biopolymer. Having high tensile strength and elastic modulus, CN is useful in replacing higher cost and lower strength material, such as carbon or glass fiber, in polymeric composites. Cellulose nanocrystals (CNC), as a subset of CN, are highly ordered nano-scale crystals remaining after treatment to remove disordered amorphous regions from nanofibrils (the next member of the cellulose hierarchy). However, due to the intrinsic hydrophilic nature of CNC the use of CNC in polymer composites has proven challenging. Poor interfacial adhesion between the CNC and the polymer and poor dispersion of the CNC in the matrix contributes to lower tensile strength and elastic modulus of the composite than would otherwise be possible. Additionally, traditional materials used in polymer composites require high amounts of energy to produce. For example, glass fibers, among the most energy-efficient materials, require 48 MJ/kg to produce compared to 20 MJ/kg required to produce CNC.

While current polymer composites achieve their intended purpose, there is a need for an improved strength, cost-effective, energy-effective, bio-based polymer composite.

SUMMARY

A reinforced polymer composite is provided, the reinforced polymer composite comprising a polymer matrix and a strengthening agent. The strengthening agent includes cellulose nanocrystals (CNC) and a stabilizing agent. The strengthening agent is homogenously dispersed in a polymer matrix.

In another example of the present invention, the cellulose nanocrystals (CNC) have dimensions of about 3 to 5 nm in width and about 100 to 300 nm in length.

In yet another example of the present invention, the cellulose nanocrystals (CNC) are highly crystalline.

In yet another example of the present invention, the cellulose nanocrystals (CNC) have a density of about 1.6 g/cm$^3$.

In yet another example of the present invention, the stabilizing agent is Boehmite nanoclay (Boe).

In yet another example of the present invention, the ratio of cellulose nanocrystals (CNC) to Boehmite nanoclay (Boe) is about 1 to 4.

In yet another example of the present invention, the stabilizing agent is Cetyltrimethylammonium Bromide (CTAB).

In yet another example of the present invention, the ratio of cellulose nanocrystals (CNC) to Cetyltrimethylammonium Bromide (CTAB) is about 8 to 1.

In yet another example of the present invention, the stabilizing agent is a combination of Boehmite nanoclay (Boe) and Cetyltrimethylammonium Bromide (CTAB).

In yet another example of the present invention, the ratio of cellulose nanocrystals (CNC) to Cetyltrimethylammonium Bromide (CTAB) to Boehmite nanoclay (Boe) is about 8 to 1 to 1.

In yet another example of the present invention, the strengthening agent is added to the polymer matrix to achieve a mixture of about 2 weight percent (wt %) to about 10 wt %.

In yet another example of the present invention, a method for preparing a reinforced polymer composite is provided. The method includes a first through six steps. The first step includes providing an aqueous cellulose nanocrystal (CNC) suspension having a net negative charge. The second step includes adding an appropriate amount of a stabilizer or a combination of stabilizers to the aqueous cellulose nanocrystal (CNC) suspension to achieve charge neutrality. The third step includes inducing phase separation by processing the stabilized aqueous cellulose nanocrystal (CNC) suspension through at least one cycle of centrifugation, rinse, and redispersion. The fourth step includes drying the stabilized cellulose nanocrystal (CNC) mixture. The fifth step includes powderizing the dried stabilized cellulose nanocrystal (CNC) mixture. The sixth step includes adding the powderized dried stabilized cellulose nanocrystal (CNC) mixture to an uncured polymer prior to the addition of a hardener and cured.

In yet another example of the present invention, the stabilizer is at least one of Boehmite nanoclay (Boe) and Cetyltrimethylammonium Bromide (CTAB).

In yet another example of the present invention, drying the stabilized cellulose nanocrystal (CNC) mixture includes one of freeze drying, spray drying, and solvent drying the cellulose nanocrystal (CNC) mixture until a liquid solvent of the stabilized aqueous cellulose nanocrystal (CNC) suspension is sublimated.

In yet another example of the present invention, the rinse of the stabilized aqueous cellulose nanocrystal (CNC) suspension in the third step is performed with de-ionized water to remove any unbound stabilizer and maintain charge neutrality in the stabilized aqueous cellulose nanocrystal (CNC) suspension.

In yet another example of the present invention, the first step further includes analyzing the aqueous cellulose nanocrystal (CNC) suspension using Dynamic Light Scattering (DLS) to determine the appropriate concentration of stabilizer to add in the second step.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

Figure 5:
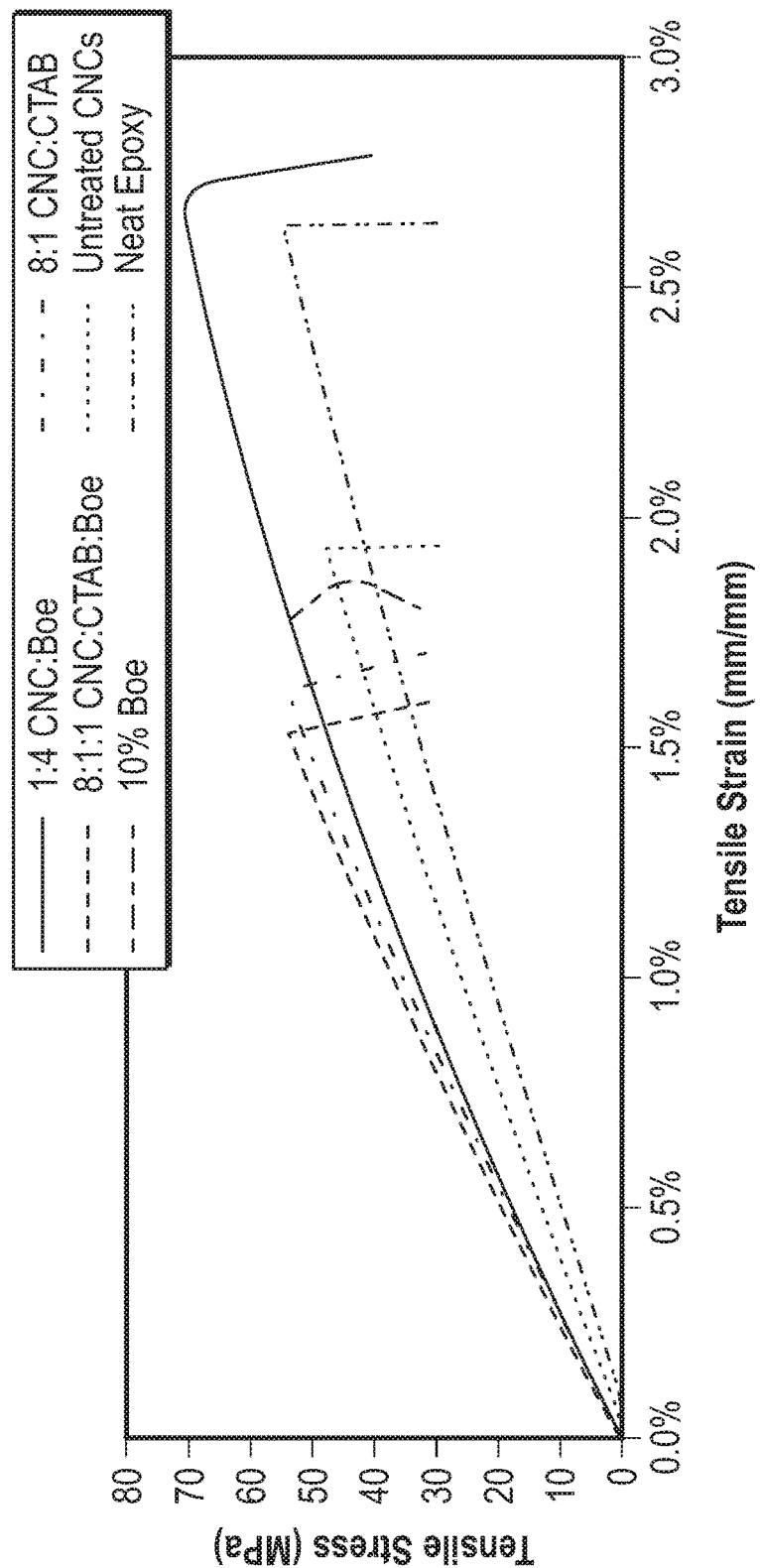
Figure 6:
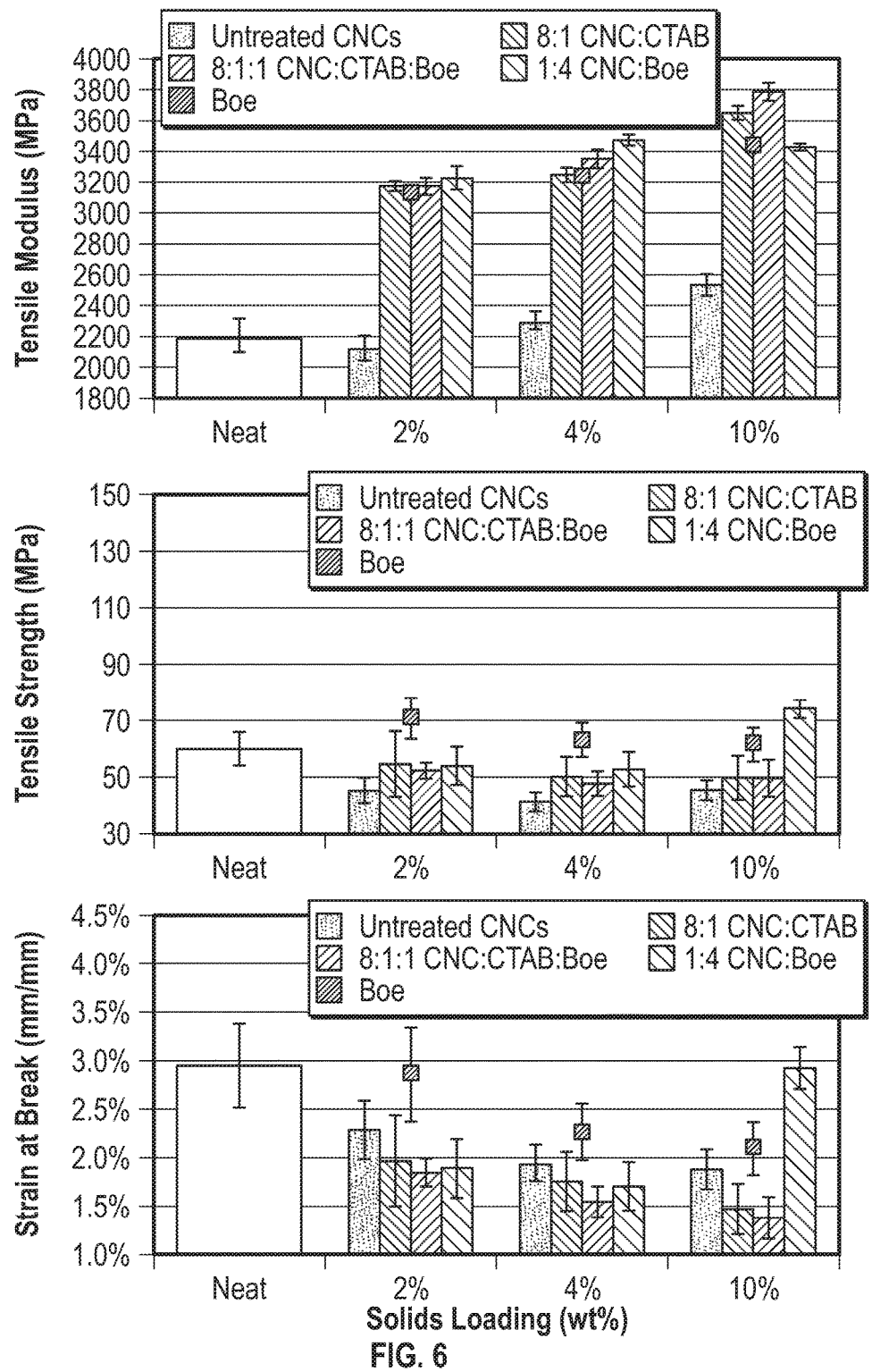

FIG. 5. is graph of Tensile Stress and Strain results for neat epoxy, CTAB-Stabiliexed CNC, Clay only, and Boe Stabilized CNC according to the principles of the present invention;

FIG. 6. is a series of graphs of results for Tensile Modulus (a), Tensile Strength (b), and Strain at Break (c) for CNC-loaded epoxy composites according to the principles of the present invention;

DETAILED DESCRIPTION

The following description is merely exemplary in nature and is not intended to limit the present disclosure, application, or uses.

Figure 1:
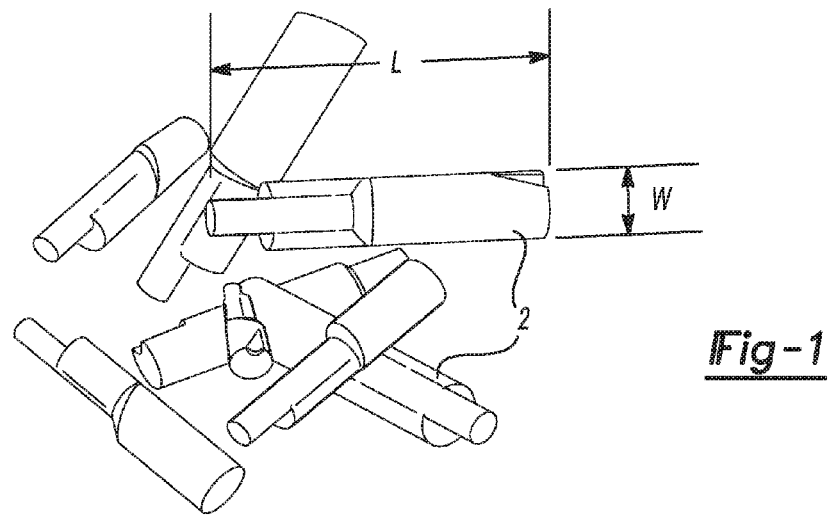
FIG. 1 is a depiction of cellulose nanocrystals according to the principles of the present invention.
Figure 2:
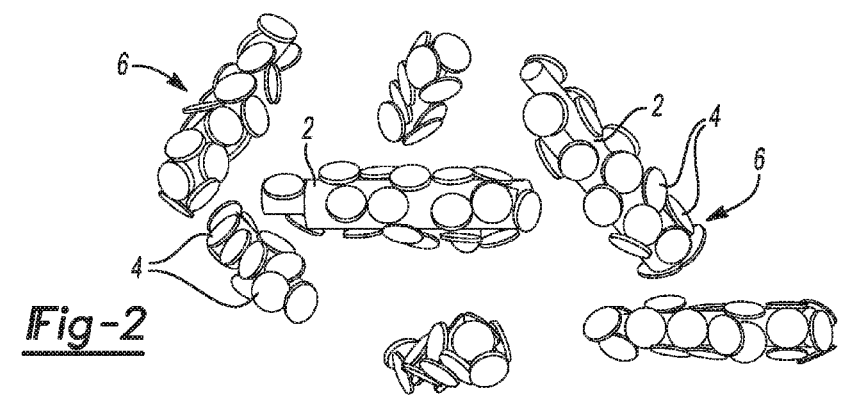
FIG. 2 is a depiction of cellulose nanocrystals treated with at least one stabilizer according to the principles of the present invention.
Figure 3:
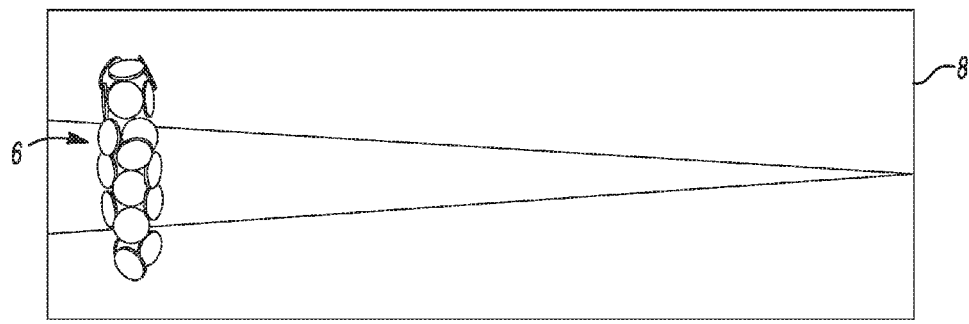
FIG. 3 is a depiction of a crack propagating through a polymer composite filled with a stabilized cellulose nanocrystal according to the principles of the present invention.

Referring to FIGS. 1-3, a plurality of cellulose nanocrystals (CNC) 2 are illustrated and will now be described. For example, the CNC 2 of FIG. 1 are shown after treatment to separate disordered amorphous regions (not shown) from the nanofibrils or cellulosic nanomaterials (CN). The dimensions of the CNC 2 are approximately 3 to 5 nm in width W and 100 to 300 nm long L. The CNC 2 are highly crystalline, roughly rectangular, and have a low density (1.6 g/cm$^3$). Other characteristics of CNC 2 include thermal stability in a nitrogen environment up to 250° C. and a strong negative surface charge of −45±1.8 mV due to residual sulfate esters remaining after the sulfuric acid treatment used to separate the CNC from the disordered amorphous material.

In preparing the CNC for use as a strengthening agent in a polymer composite, a CNC suspension requires stabilization. As shown in FIG. 2, a stabilized CNC 6 is depicted. In this example, Boehmite nanoclay (Boe) 4 is electrostatically adsorbed on the surface of the CNC 2. The individual Boe 4 nano-particles have a plate-like structure. As a combined system, the plurality of Boe 4 particles disposed on the surface of the CNC 2 result in a highly irregular and rough surface compared to the untreated CNC 2 surface.

In another example of a stabilized CNC 6, Cetyltrimethylammonium Bromide (CTAB) is electrostatically adsorbed by the surface of the CNC 2 which stabilizes dispersions in apolar solvents. The resulting material is a stabilized CNC 6. Another example of a stabilized CNC 6 includes adding both CTAB and Boe to the CNC.

In another example of the present invention, FIG. 3 illustrates a Boe stabilized CNC 6 as it might appear in an epoxy polymer composite 8. The surface of the stabilized CNC 6 has a physical interlock with the matrix polymer 8 helping to prevent crack widening as the crack propagates through the cross-section of polymer composite 8. Epoxy is mentioned as one example of a polymer system but this is not intended to limit the scope of the invention to stabilized CNC 6 and epoxy only.

Figure 4:
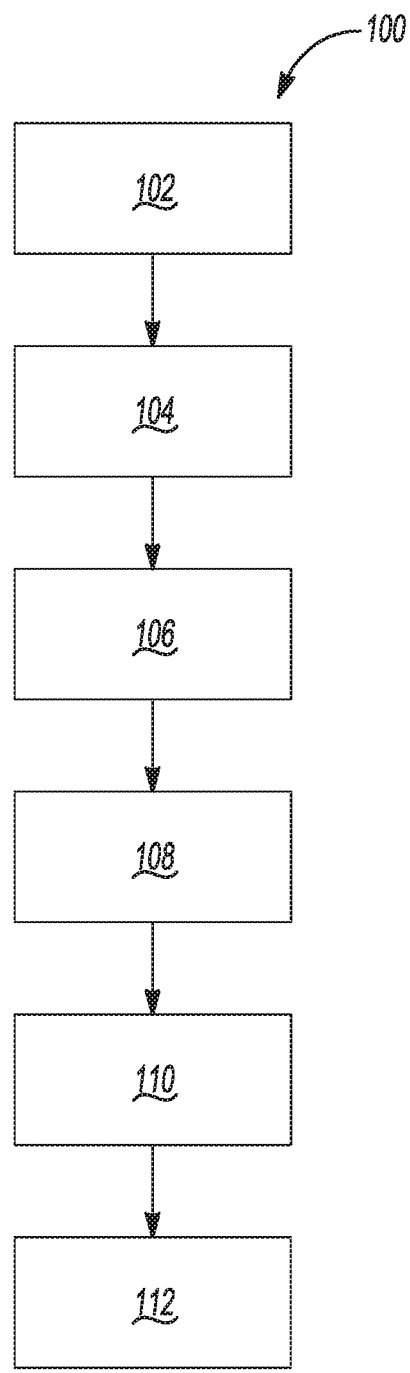
FIG. 4 is a flowchart depicting a method of producing stabilized cellulose nanocrystal according to the principles of the present invention.

Referring now to FIG. 4, a method 100 of preparation of stabilized CNC powder for use in epoxy composite systems is illustrated and will now be described. The method 100 includes a first step 102 of providing an aqueous CNC suspension. The aqueous solution CNC was obtained from Forest Products Laboratory (Madison, Wisc.). The aqueous CNC were analyzed using Dynamic Light Scattering (DLS) to determine the appropriate concentration of stabilizer which would displace the Na+ counter-ion and achieve charge neutrality. A second step 104 includes adding an appropriate amount of a stabilizer or stabilizers to achieve charge neutrality. A first potential stabilizer is a cationic surfactant such as Cetyltrimethylammonium Bromide (CTAB) obtained from Sigma Aldrich (St. Louis, Mo.) while a second potential stabilizer is nanoclay such as Boehmite nanoclay (Boe) obtained from Esprix Technologies (Sarasota, Fla.). However, other potential dispersion agents or stabilizers may be used alone or in combination without departing from the scope of this invention. A third step 106 includes inducing phase separation by three cycles of centrifugation, rinse, and redispersion. The rinse is performed with de-ionized water to remove any unbound stabilizer. A fourth step 108 includes freeze drying, spray drying, and solvent drying the stabilized aqueous cellulose nanocrystal (CNC) suspension mixture until a liquid solvent of the stabilized aqueous cellulose nanocrystal (CNC) suspension is sublimated. A fifth step 110 includes powderizing the dried stabilized CNC, for example, using roller milling for between 1 and 8 hours.

Once the powder is obtained per the process in FIG. 4, a sixth step 112 adds the dried stabilized CNC powder to the epoxy prior to the addition of an appropriate hardener (e.g. amine or anhydride curing agent). The system is then cured according to the same cure schedule as would be used for an unfilled epoxy composite.

Examples of the recipe of the stabilized CNC are as follows. The examples include mass ratios of recipes containing CNC and CTAB, CNC and Boe, and CNC, CTAB, and Boe.

| Recipe | Mass Ratio | ζ Avg. (mV) | ζ Std. Dev. (mV) |
|---|---|---|---|
| Aqueous CNC | — | −37.4 | 8.2 |
| Aqueous CTAB | — | +61.4 | 14.3 |
| Aqueous Boe | — | +40 | 9.8 |
| CNC:CTAB | 8:1 | −1.5 | 4.2 |
| CNC:CTAB:Boe | 8:1:1 | −10.3 | 4.1 |
| CNC:Boe | 1:4 | −19.4 | 4.8 |

The stabilized CNC powder was incorporated into polymer composite mechanical test samples. Tensile testing was performed according to ASTM D638. Five specimens of each sample recipe were analyzed at each loading, for example 2 wt %, 4 wt %, and 10 wt %. Tensile tests were performed on an Instron Model 3345 load frame with a 5 kN load cell. The crosshead speed was 5.0 mm/min. Specimen dimensions were taken with a Mitutoyo digital micrometer with 1 μm accuracy mounted in a micrometer vise to ensure repeatable specimen positioning. The specimens were tested as-cast from an aluminum mold.

Representative plots of Tensile Stress v Tensile Strain for specimens loaded at 10 wt % are shown below in FIG. 5.

The results for Tensile stiffness, strength and strain at break for loadings of 2 wt %, 4 wt % and 10 wt % were averaged and are shown in FIG. 6. The 1:4 loading of CNC:Boe exhibits stiffness increases of 56.2% over neat epoxy and 35.2% over untreated CNC. The CNC:Boe composites increase tensile strength by 23% over unfilled epoxy and 63% over an unstabilized CNC-epoxy composite. Composites loaded with an 8:1:1 ratio of CNC:CTAB:Boehmite had 72% higher stiffness than neat epoxy and 49% over untreated CNCs, but the strength and elongation were diminished relative to neat epoxy.

The description of the invention is merely exemplary in nature and variations that do not depart from the spirit of the invention are intended to be within the scope of the invention. Such variations are not to be regarded as a departure from the spirit and scope of the invention.

We claim:

1. A reinforced polymer composite, the reinforced polymer composite comprising:
   a polymer matrix, and
   a strengthening agent, the strengthening agent including cellulose nanocrystals (CNC) and a stabilizing agent, wherein the stabilizing agent includes Boehmite nanoclay (Boe); and
   wherein the strengthening agent is homogenously dispersed in the polymer matrix.

2. The reinforced polymer composite of claim 1, wherein the cellulose nanocrystals (CNC) have dimensions of about 3 to 5 nm in width and about 100 to 300 nm in length.

3. The reinforced polymer composite of claim 1, wherein the cellulose nanocrystals (CNC) are highly crystalline.

4. The reinforced polymer composite of claim 1, wherein the cellulose nanocrystals (CNC) have a density of about 1.6 g/cm3.

5. The reinforced polymer composite of claim 1 wherein the ratio of cellulose nanocrystals (CNC) to Boehmite nanoclay (Boe) is about 1 to 4.

6. The reinforced polymer composite of claim 1 wherein the polymer matrix is a thermoset polymer matrix and the strengthening agent is added to the thermoset polymer matrix to achieve a mixture of about 2weight percent to about 10 weight percent strengthening agent.

7. A reinforced polymer composite, the reinforced polymer composite comprising:
   a polymer matrix, and
   a strengthening agent, the strengthening agent including cellulose nanocrystals (CNC) and a stabilizing agent, wherein the stabilizing agent includes Cetyltrimethylammonium Bromide (CTAB) and wherein the ratio of cellulose nanocrystals (CNC) to Cetyltrimethylammonium Bromide (CTAB) is about 8 to 1; and
   wherein the strengthening agent is homogenously dispersed in the polymer matrix.

8. The reinforced polymer composite of claim 7 wherein the stabilizing agent further includes Boehmite nanoclay (Boe).

9. The reinforced polymer composite of claim 8 wherein the ratio of cellulose nanocrystals (CNC) to Cetyltrimethylammonium Bromide (CTAB) to Boehmite nanoclay (Boe) is about 8 to 1 to 1.

10. A method for preparing a reinforced polymer composite, the method including:
    a first step includes providing an aqueous cellulose nanocrystal (CNC) suspension having a net negative charge;
    a second step includes adding an appropriate amount of a stabilizer or a combination of stabilizers to the aqueous cellulose nanocrystal (CNC) suspension to achieve charge neutrality;
    a third step includes inducing phase separation by processing the stabilized aqueous cellulose nanocrystal (CNC) suspension through at least one cycle of centrifugation, rinse, and redispersion;
    a fourth step includes drying the stabilized cellulose nanocrystal (CNC) mixture;
    a fifth step includes powderizing the dried stabilized cellulose nanocrystal (CNC) mixture; and
    a sixth step includes adding the powderized dried stabilized cellulose nanocrystal (CNC) mixture to an uncured polymer prior to the addition of a hardener and cured.

11. The method of preparing a reinforced polymer composite of claim 10, wherein the stabilizer is at least one of Boehmite nanoclay (Boe) and Cetyltrimethylammonium Bromide (CTAB).

12. The method of preparing a reinforced polymer composite of claim 10, wherein drying the stabilized cellulose nanocrystal (CNC) mixture includes one of freeze drying, spray drying, and solvent drying the cellulose nanocrystal (CNC) mixture until a liquid solvent of the stabilized aqueous cellulose nanocrystal (CNC) suspension is sublimated.

13. The method of preparing a reinforced polymer composite of claim 10, wherein rinsing the stabilized aqueous cellulose nanocrystal (CNC) suspension in the third step is performed with de-ionized water to remove any unbound stabilizer and maintain charge neutrality in the stabilized aqueous cellulose nanocrystal (CNC) suspension.

14. The method of preparing a reinforced polymer composite of claim 10, wherein the first step further includes analyzing the aqueous cellulose nanocrystal (CNC) suspension using Dynamic Light Scattering (DLS) to determine the appropriate concentration of stabilizer to add in the second step.

15. A reinforced polymer composite, the reinforced polymer composite comprising:
    a polymer matrix, and
    a strengthening agent, the strengthening agent including highly crystalline cellulose nanocrystals (CNC) and a stabilizing agent, and wherein the crystalline cellulose nanocrystals (CNC) have dimensions of about 3 to 5 nm in width and about 100 to 300 nm in length and a density of about 1.6 g/cm3 and the stabilizing agent includes Boehmite nanoclay (Boe) and Cetyltrimethylammonium Bromide (CTAB); and
    wherein the strengthening agent is homogenously dispersed in the polymer matrix and is added to the polymer matrix to achieve a mixture of about 2 weight percent to about 10 weight percent strengthening agent.

16. The reinforced polymer composite of claim 15, wherein the the ratio of cellulose nanocrystals (CNC) to Boehmite nanoclay (Boe) is about 1 to 4.

17. The reinforced polymer composite of claim 15 wherein the ratio of cellulose nanocrystals (CNC) to Cetyltrimethylammonium Bromide (CTAB) is about 8 to 1.

18. The reinforced polymer composite of claim 15 wherein the ratio of cellulose nanocrystals (CNC) to Cetyltrimethylammonium Bromide (CTAB) to Boehmite nanoclay (Boe) is about 8 to 1 to 1.

* * * * *